US010752436B2

(12) United States Patent
Huber et al.

(10) Patent No.: US 10,752,436 B2
(45) Date of Patent: Aug. 25, 2020

(54) SECONDARY SOLID WASTE CONTAINER FOR SOLID WASTE OF AN ANALYZER

(71) Applicant: Roche Diagnostics Operations, Inc., Indianapolis, IN (US)

(72) Inventors: David Huber, Ebikon (CH); Bruno Koch, Steinhausen (CH); Franz Lindegger, Sempach (CH); Marco Sangermano, Kriens (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 107 days.

(21) Appl. No.: 15/921,816

(22) Filed: Mar. 15, 2018

(65) Prior Publication Data

US 2018/0265288 A1    Sep. 20, 2018

(30) Foreign Application Priority Data

Mar. 20, 2017  (EP) .................................. 17161803

(51) Int. Cl.
| *G01N 1/00* | (2006.01) |
| *B65F 1/16* | (2006.01) |
| *B65F 1/14* | (2006.01) |
| *G01N 35/04* | (2006.01) |
| *G01N 35/00* | (2006.01) |

(Continued)

(52) U.S. Cl.
CPC .............. *B65F 1/1607* (2013.01); *B01L 1/50* (2013.01); *B65F 1/1421* (2013.01); *B65F 1/1436* (2013.01); *G01N 35/00* (2013.01); *G01N 35/04* (2013.01); *B01L 2300/12* (2013.01); *B65F 1/1478* (2013.01); *G01N 2035/00277* (2013.01); *G01N 2035/0406* (2013.01); *G01N 2035/0422* (2013.01); *G01N 2035/103* (2013.01)

(58) Field of Classification Search
CPC ...................................................... G01N 1/00
See application file for complete search history.

(56) References Cited

U.S. PATENT DOCUMENTS

| 6,238,907 B1 * | 5/2001 | Schuler-Maloney ........................ A61B 10/0096 206/459.5 |
| 7,931,861 B2 | 4/2011 | Kitagawa |
| 2011/0158865 A1 | 6/2011 | Miller et al. |

FOREIGN PATENT DOCUMENTS

| CN | 203033248 U | 7/2013 |
| EP | 0502638 B1 | 5/2000 |

(Continued)

OTHER PUBLICATIONS

Search Report dated Aug. 23, 2017, in Application No. EP 17161803.6, 3 pages.

*Primary Examiner* — Jyoti Nagpaul
(74) *Attorney, Agent, or Firm* — Roche Diagnostics Operations, Inc.

(57) ABSTRACT

A secondary solid waste container for solid waste of an analyzer is disclosed. The secondary solid waste container comprises side walls and an impact absorbing member. The side walls comprise an upper end and a lower end. The impact absorbing member is connected to the side walls such that the impact absorbing member extends between the side walls and is spaced apart from the lower end with respect to a direction from the lower end to the upper end. The impact absorbing member is configured to absorb an impact from solid waste of the analyzer. An analyzer and a method for removing solid waste of an analyzer are also disclosed.

16 Claims, 2 Drawing Sheets

(51) Int. Cl.
   *B01L 1/00*       (2006.01)
   *G01N 35/10*       (2006.01)

(56) References Cited

FOREIGN PATENT DOCUMENTS

| | | |
|---|---|---|
| EP | 2368814 A1 | 9/2011 |
| FR | 2870219 A1 | 11/2005 |
| JP | S55-96805 U | 7/1980 |
| JP | H09-150905 A | 6/1997 |
| JP | 3-049256 B2 | 6/2000 |
| JP | 2001-165937 A | 6/2001 |
| JP | 2003-083986 A | 3/2003 |
| JP | 2006-103753 A | 4/2006 |
| WO | 2011/122562 A1 | 10/2011 |

\* cited by examiner

SECONDARY SOLID WASTE CONTAINER FOR SOLID WASTE OF AN ANALYZER

CROSS-REFERENCE TO RELATED APPLICATIONS

This application claims the benefit of EP 17161803.6, filed Mar. 20, 2017, which is hereby incorporated by reference.

BACKGROUND

The present disclosure generally relates to a secondary solid waste container for solid waste of an analyzer, to an analyzer and to a method for removing solid waste of an analyzer.

Modern analyzers are based on automated sample processing systems. Such systems permit greatly increased sample processing throughput, decrease the need for manual labor and allow for productive use of an operator's "walk-away time" during sample processing.

Such analyzers use a plurality of consumables during operation such as pipetting tips and reaction vessels. The consumables may be discarded into one or more solid waste containers once they have been used.

It is advantageous if the analyzers are continuously operated by preventing interruption of the operation when replacing a filled solid waste container. One way of solving this problem is to use two solid waste containers in order to divert waste of consumables from one solid waste container to the other solid waste container when one is filled, thereby allowing the filled solid waste container to be replaced without interruption of operation. With this arrangement, however, more space for accommodating two solid waste containers of the same size is needed, which is rarely available unless increasing the footprint and size of the analyzer.

Therefore, there is a need for a secondary solid waste container that has a reduced height and smaller capacity for receiving solid waste than a primary solid waste container.

SUMMARY

According to the present disclosure, a secondary solid waste container for solid waste of an analyzer is presented. The secondary solid waste container can comprise side walls. The side walls can comprise an upper end and a lower end. The secondary solid waste container can also comprise an impact absorbing member. The impact absorbing member can be connected to the side walls such that the impact absorbing member extends between the side walls and can be spaced apart from the lower end with respect to a direction from the lower end to the upper end. The impact absorbing member can be configured to absorb an impact from solid waste of the analyzer.

In accordance with one embodiment of the present disclosure, a method for removing solid waste of an analyzer is presented. The method can comprise disposing a primary solid waste container within a compartment for receiving the primary solid waste container of the analyzer, disposing an above-described secondary solid waste container within the analyzer at a position below the compartment for receiving the primary solid waste container, collecting solid waste within the primary solid waste container up to a predetermined amount, removing the primary solid waste container from the compartment if solid waste has been collected to the predetermined amount, and collecting solid waste within the secondary solid waste container while the primary solid waste container is removed from the compartment.

Accordingly, it is a feature of the embodiments of the present disclosure to provide for a secondary solid waste container that has a reduced height and smaller capacity for receiving solid waste than a primary solid waste container. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
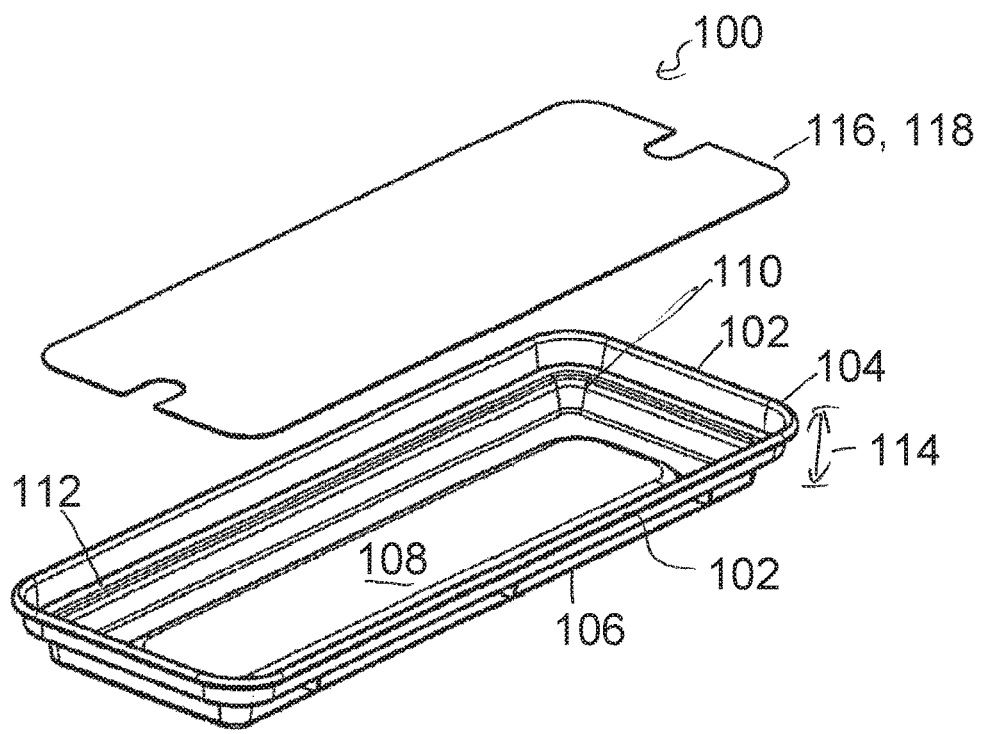
FIG. 1 illustrates a perspective view of a secondary solid waste container according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A secondary solid waste container is introduced that can have a reduced height and smaller capacity for receiving solid waste than a primary solid waste container. The secondary solid waste container can be thus placed underneath the primary solid waste container. With this arrangement, solid waste can be mainly collected within the primary solid waste container and can be collected within the secondary solid waste container only during the time the filled primary solid waste container is replaced. As soon as the primary solid waste container is discharged and re-inserted into the analyzer, solid waste can be collected within the primary solid waste container again but not in the secondary solid waste container. In this manner space, requirements for solid waste can be minimized. As the solid waste may contain infectious material and there can be a risk of contamination of the analyzer if the solid waste does not remain within the secondary solid waste container, with the design of the secondary solid waste container it can also be prevented that solid waste dropped off into the secondary solid waste container can be reflected and bounce out of the secondary solid waste container and can stop at random positions within the interior of the analyzer.

In particular, disclosed herein are a secondary solid waste container for solid waste of an analyzer, an analyzer and a method for removing solid waste of an analyzer that provide a configuration of ensuring that solid waste once discarded therein remains within the secondary solid waste container and is not reflected out of it.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

The disclosed secondary solid waste container can comprise side walls and an impact absorbing member. The side walls can have an upper end and a lower end. The impact absorbing member can be connected to the side walls such that the impact absorbing member can extend between the side walls and can be spaced apart from the lower end with respect to a direction from the lower end to the upper end. The impact absorbing member can be configured to absorb an impact from solid waste of the analyzer.

The term "secondary solid waste container" as used herein can refer to a solid waste container used only for secondarily or temporarily collecting solid waste and not used to mainly collect solid waste. In other words, a secondary solid waste container can be a solid waste container exclusively used to collect solid waste during a replacement of a primary solid waste container, which can be used to mainly collect solid waste.

The term "solid waste" as used herein can refer to any kind of waste in a solid state resulting from consuming a consumable of an analyzer such as, for example, pipetting tips, reaction vessels, e.g. cuvettes, sample vessels and the like which can be disposable or single-use products.

The term "side walls" as used herein can refer to any constructional member configured to laterally define a storage capacity of the secondary solid waste container. Thus, the side walls may be side walls that can be continuously formed so as to transition into one another or may be formed as frames such as rods surrounding a predetermined volume.

The terms "upper end" and "lower end" as used herein can refer to a definition for the orientation of the side walls with respect to the direction of gravity. In other words, the intended or target orientation of the side walls can be such that the upper end can be arranged above the lower end as seen in the direction of gravity.

The term "connected" as used herein can refer to a permanent, fixed, removable or loose connection of two constructional members such as the impact absorbing member and the side walls. Thus, the impact absorbing member may be permanently mounted to the side walls, removably mounted to the side walls or loosely mounted to the side walls such as laid against the side walls.

As the impact absorbing member is disposed a predetermined distance from a plane substantially parallel to the lower end of the side walls, the impact absorbing member may absorb an impact from solid waste by being at least partially deflected or deformed towards the plane substantially parallel to the lower end of the side walls. Thus, the impact absorbing member can have characteristics similar to a jumping sheet or rescue net. Thereby, solid waste can be prevented from being reflected in a manner of leaving the secondary solid waste container.

The secondary solid waste container may further comprise a bottom to which the side walls can be connected at the lower end thereof. Thus, the secondary solid waste container may be formed similar to a waste box or waste pan.

The upper end of the side walls may define an opening through which solid waste may be discarded in the secondary solid waste container. Thus, solid waste may be dropped into the secondary solid waste container and received by the impact absorbing member.

The impact absorbing member may be connected to the side walls at a position located within an upper half or even upper third of the height of the side walls opposite to the lower end. Thus, the impact absorbing member may be disposed closer to the upper end than to the lower end, which can improve the impact absorbing characteristics.

The impact absorbing member may be connected to a rim of the side walls opposite to the bottom. Thus, the impact absorbing member may be reliably supported at the outer edges thereof.

The impact absorbing member may have damping characteristics. Thus, the impact absorbing member may damp an impact from solid waste such that solid waste can be reliably prevented from being reflected out of the secondary solid waste container.

The damping characteristics may be adjusted depending on the type of solid waste, the weight of the solid waste and a fall height for the solid waste within the analyzer. Thus, impact absorbing member may be individually configured according to the intended application purpose.

The impact absorbing member may be deformable so as to absorb an impact from solid waste of the analyzer. For example, the impact absorbing member may be elastically deformable. Thus, it can be the combined effect of material, shape and air cushion underneath the impact absorbing member that can enable shock wave dissipation.

The impact absorbing member may be made of a sterilizable and/or autoclavable material. Thus, the impact absorbing member may not only be cleaned as appropriate but may also be sterilized and/or autoclaved. Thereby, any contamination caused by any infectious material discharged from the solid waste may be prevented.

The impact absorbing member may be at least partially and preferably completely made of plastics or metal. Thus, the impact absorbing member may be manufactured in a cost efficient manner.

The impact absorbing member may be made for example of at least one element selected from the group comprising: polypropylene (PP), polyvinyl chloride (PVC), polyethylene (PE), high density polyethylene (HDPE), polytetrafluoroethylene (Teflon), polyethylene terephthalate (PET), and metal foils, e.g. aluminum foil. The list is not exhaustive. Thus, the impact absorbing member may be made of a material selected from a plurality of materials.

The impact absorbing member may be removably mounted to the side walls. Thus, the impact absorbing member may be removed from the side walls for cleaning, sterilizing, autoclaving, depending on the material, and/or maintenance purposes. In alternative to cleaning, sterilizing, autoclaving, the impact absorbing member may also be disposable and replaceable with a new one.

The impact absorbing member may comprise a thickness in a range of 0.25 mm to 3.0 mm. According to one embodiment, the thickness can be in a range of 0.5 mm to 2.5 mm. According to another embodiment, the thickness can be in a range of 0.75 mm to 2.0 mm. Thus, the impact absorbing member may be rather thin.

The impact absorbing member may be a plate, a sheet, a foil or a net. Thus, various different types of impact absorbing members may be used with the secondary solid waste container.

The secondary solid waste container may be configured to be arranged within an analyzer at a position below a compartment for receiving a primary solid waste container of the analyzer with respect to a direction of gravity. Thus, the secondary solid waste container may be arranged in a compact manner.

Further, an analyzer is disclosed. The analyzer can comprise an analytical device configured to use a consumable, a primary solid waste container and a secondary solid waste container as described above. Thus, the analyzer may be continuously operated and the secondary solid waste container may be used during a replacement of the primary solid waste container without the risk of solid waste being deflected out of the secondary solid waste container.

The term "analyzer" as used herein can refer to any apparatus or apparatus component configured to obtain a measurement value. An analyzer can be operable to determine via various chemical, biological, physical, optical or other technical procedures a parameter value of the sample or a component thereof. An analyzer may be operable to measure the parameter of the sample or of at least one analyte and return the obtained measurement value. For this purpose, the analyzer can comprise an analytical device. The list of possible analysis results returned by the analyzer can comprise, without limitation, concentrations of the analyte in the sample, a digital (yes or no) result indicating the existence of the analyte in the sample (corresponding to a concentration above the detection level), optical parameters, DNA or RNA sequences, data obtained from mass spectroscopy of proteins or metabolites and physical or chemical parameters of various types. An analytical instrument may comprise units for pipetting, dosing, and mixing of samples and/or reagents. The analyzer may comprise a reagent holding unit for holding reagents to perform the assays. Reagents may be arranged for example in the form of containers or cassettes containing individual reagents or group of reagents, placed in appropriate receptacles or positions within a storage compartment or conveyor. It may comprise a consumable feeding unit. The analyzer may comprise a process and detection system whose workflow can be optimized for certain types of analysis. Examples of such analyzer can be clinical chemistry analyzers, coagulation chemistry analyzers, immunochemistry analyzers, urine analyzers, nucleic acid analyzers, used to detect the result of chemical or biological reactions or to monitor the progress of chemical or biological reactions.

The secondary solid waste container may be arranged within the analyzer at a position below a compartment for receiving the primary solid waste container of the analyzer with respect to a direction of gravity. Thus, the secondary solid waste container may be arranged in a compact manner within the analyzer.

Further, a method for removing solid waste of an analyzer is disclosed. The method can comprise disposing a primary solid waste container within a compartment for receiving the primary solid waste container of the analyzer, disposing a secondary solid waste container as described before within the analyzer at a position below the compartment for receiving the primary solid waste container, collecting solid waste within the primary solid waste container up to a predetermined amount, removing the primary solid waste container from the compartment if solid waste has been collected to the predetermined amount, and collecting solid waste within the secondary solid waste container while the primary solid waste container is removed from the compartment.

The solid waste may be collected within the secondary solid waste container by falling onto the impact absorbing member. Thus, as the solid waste is not reflected out of the secondary solid waste container due to the impact absorbing member, the solid waste can remain on the impact absorbing member after falling down onto the impact absorbing member.

The method may further comprise discharging the solid waste collected within the primary solid waste container and disposing the primary solid waste container into the compartment after the solid waste has been discharged therefrom. Thus, the primary solid waste container may be replaced and during this time, solid waste can be collected within the secondary solid waste container.

The method may further comprise collecting solid waste within the primary solid waste container after disposing the discharged primary solid waste container into the compartment. Thus, the primary solid waste container may be used again after the solid waste is discharged from the primary solid waste container.

Solid waste may be collected within the secondary solid waste container exclusively while the primary solid waste container is removed from the compartment. Thus, the secondary solid waste container may be dimensioned rather small as it is used only for a rather short time.

The method may further comprise discharging the solid waste collected within the secondary solid waste container after disposing the discharged primary solid waste container into the compartment.

The method may further comprise sterilizing and/or autoclaving the impact absorbing member after discharging solid waste collected within the secondary solid waste container. Thus, the impact absorbing member may be used again.

A secondary solid waste container for solid waste of an analyzer can comprise side walls and an impact absorbing member. The side walls can have an upper end and a lower end. The impact absorbing member can be connected to the side walls such that the impact absorbing member can extend between the side walls and can be spaced apart from the lower end with respect to a direction from the lower end to the upper end. The impact absorbing member can be configured to absorb an impact from solid waste of the analyzer.

The secondary solid waste container can further comprise a bottom to which the side walls can be connected at the lower end thereof.

The upper end of the side walls can define an opening through which solid waste can be disposable in the secondary solid waste container.

The impact absorbing member can be connected to the side walls at a position located within an upper half of the height of the side walls opposite to the bottom.

The impact absorbing member can be connected to a rim of the side walls opposite to the bottom.

The impact absorbing member can have damping characteristics. The damping characteristics can be adjusted depending on the type of solid waste, the weight of the solid waste and a fall height for the solid waste within the analyzer.

The impact absorbing member can be deformable so as to absorb an impact from solid waste of the analyzer. The impact absorbing member is elastically deformable.

The impact absorbing member can be made of a sterilizable and/or autoclavable material.

The impact absorbing member can be at least partially and preferably completely made of plastics or metal.

The impact absorbing member can be made of at least one element selected from the group comprising polypropylene, polyvinyl chloride, polyethylene, high density polyethylene, polytetrafluoroethylene, polyethylene terephthalate and aluminum.

The impact absorbing member can be removably connected to the side walls.

The impact absorbing member comprises a thickness in a range of 0.25 mm to 3.0 mm in one embodiment, 0.5 mm to 2.5 mm in another embodiment, and 0.75 mm to 2.0 mm in yet another embodiment.

The impact absorbing member can be a plate, a sheet, a foil or a net.

The secondary solid waste container can be configured to be arranged within an analyzer at a position below a compartment for receiving a primary solid waste container of the analyzer with respect to a direction of gravity.

An analyzer can comprise an analytical device configured to use a consumable, a primary solid waste container and an above secondary solid waste container. The secondary solid waste container can be arranged within the analyzer at a position below a compartment for receiving the primary solid waste container of the analyzer with respect to a direction of gravity.

A method for removing solid waste of an analyzer is disclosed. The method can comprise disposing a primary solid waste container within a compartment for receiving the primary solid waste container of the analyzer, disposing an above-described secondary solid waste container within the analyzer at a position below the compartment for receiving the primary solid waste container, collecting solid waste within the primary solid waste container up to a predetermined amount, removing the primary solid waste container from the compartment if solid waste has been collected to the predetermined amount, and collecting solid waste within the secondary solid waste container while the primary solid waste container is removed from the compartment.

The solid waste can be collected within the secondary solid waste container by falling onto the impact absorbing member.

The method can further comprise discharging the solid waste collected within the primary solid waste container and disposing the primary solid waste container into the compartment after the solid waste has been discharged therefrom. The method can further comprise collecting solid waste within the primary solid waste container after disposing the discharged primary solid waste container into the compartment.

Solid waste can be collected within the secondary solid waste container exclusively while the primary solid waste container can be removed from the compartment.

The method can further comprise discharging the solid waste collected within the secondary solid waste container after disposing the discharged primary solid waste container into the compartment.

The method can further comprise sterilizing and/or autoclaving the impact absorbing member after discharging solid waste collected within the secondary solid waste container.

Referring initially to FIG. 1, FIG. 1 shows a perspective view of a secondary solid waste container 100. The secondary solid waste container 100 can comprise side walls 102. The side walls 102 can have an upper end 104 and a lower end 106. The secondary solid waste container 100 can further comprise a bottom 108 to which the side walls 102 can be connected at the lower end 106 thereof. The upper end 104 of the side walls 102 can define an opening 110. In the embodiment shown in FIG. 1, the secondary solid waste container 100 can comprise four continuous side walls 102 arranged in a substantially rectangular orientation as seen in a plan view. Particularly, the four side walls 102 can transition into one another. Further, the side walls 102 can transition into the bottom 108. Thus, the side walls 102 and the bottom 108 may be integrally or monolithically formed. The side walls 102 can further comprise a rim 112. The rim 112 can be located at a position within an upper half of a height 114 of the side walls 102 opposite to the bottom 108. For example, the rim 112 can be formed at position being an upper third of the height 114 of the side walls 102.

The secondary solid waste container 100 can further comprise an impact absorbing member 116. The impact absorbing member 116 can comprise a thickness in a range of 0.25 mm to 3.0 mm in one embodiment, 0.5 mm to 2.5 mm in another embodiment, and of 0.75 mm to 2.0 mm, such as 1.0 mm, in yet another embodiment. In the embodiment shown in FIG. 1, the impact absorbing member 116 can be a plate 118. The plate 118 can comprise a substantially rectangular shape as seen in a plan view. Alternatively, the impact absorbing member 116 may be a sheet, a foil or a net. The impact absorbing member 116 can be made of a sterilizable and/or autoclavable material. Particularly, the impact absorbing member 116 can at least partially and preferably completely be made of plastics or metal. More particularly, the impact absorbing member 116 can be made of at least one element selected from the group comprising: polypropylene (PP), polyvinyl chloride (PVC), polyethylene (PE), high density polyethylene (HDPE), polytetrafluoroethylene (Teflon), polyethylene terephthalate (PET), and metal foils, e.g. aluminum foil. The list is not exhaustive. In the embodiment shown in FIG. 1, the impact absorbing member 116 can be made of polypropylene. The impact absorbing member 116 can have damping characteristics. The impact absorbing member 116 can be elastically deformable.

The impact absorbing member 116 can be connected to the side walls 102 such that the impact absorbing member 116 can extend between the side walls 102 and can be spaced apart from the lower end 106 with respect to a direction from the lower end 106 to the upper end 104. The impact absorbing member 116 can be connected to the side walls 102 at a position located within an upper half of the height 114 of the side walls 102 opposite to the bottom 108.

Particularly, the impact absorbing member 116 can be removably connected to the side walls 102. The impact absorbing member 116 can be connected to rim 112 of the side walls 102. For example, the impact absorbing member 116 can be laid onto rim 112.

Figure 2:
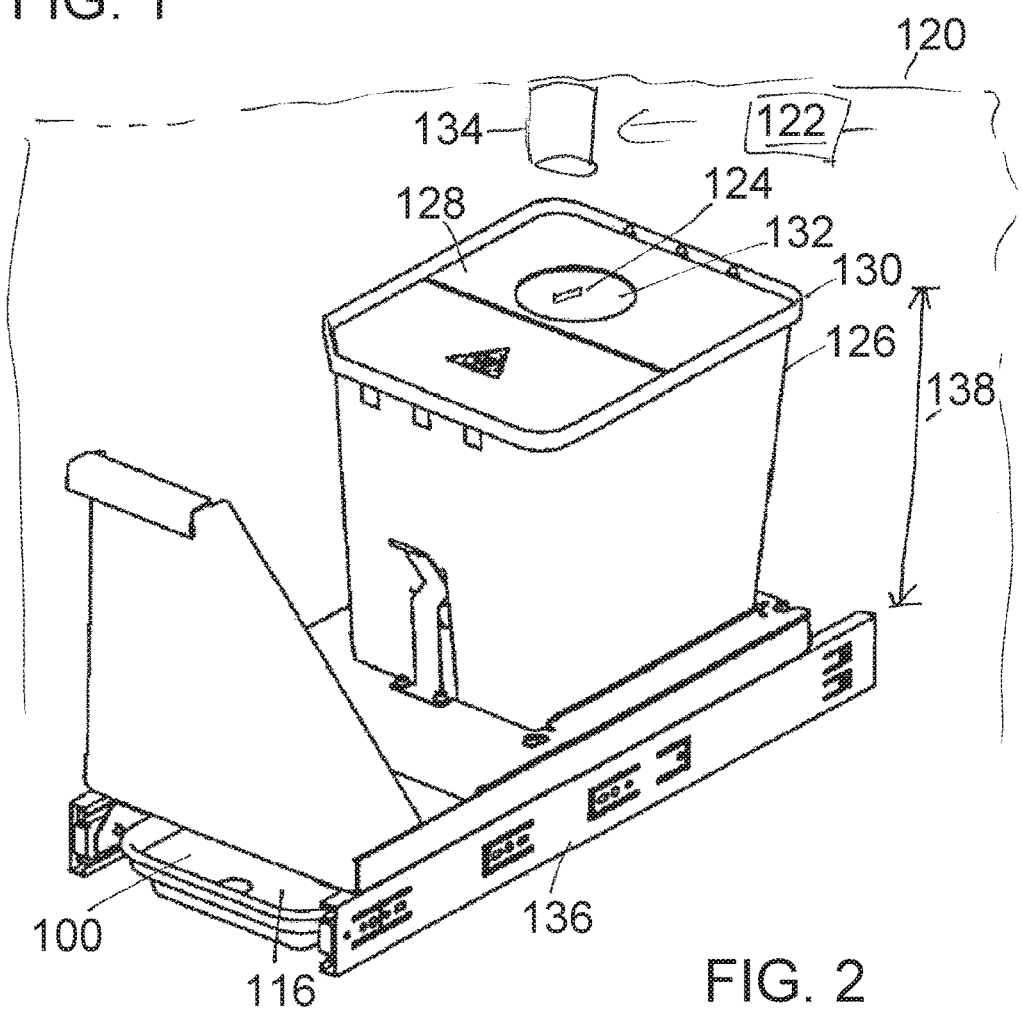
FIG. 2 illustrates an analyzer in a first operation state according to an embodiment of the present disclosure.

FIG. 2 shows an analyzer 120 in a first operation state. The analyzer 120 can comprise an analytical device 122 configured to use a consumable such as a cuvette. The analyzer 120 can further comprise a primary solid waste container 126 and a secondary solid waste container 100 as described above. After use, the consumable can be solid waste 124 of the analyzer 120. The primary solid waste container 126 can have a substantially cuboid shape. For example, the primary solid waste container 126 can be formed similar to a waste container or garbage can. Particularly, the primary solid waste container 126 can comprise a greater capacity for solid waste 124 than the secondary solid waste container 100. The primary solid waste container 126 can comprise a lid or cover 128 at an upper end 130 thereof. The cover 128 can comprise an opening 132 through which solid waste 124 can be disposable in the primary solid waste container 126. Particularly, solid waste 124 may be dropped into the primary solid waste container 126 from a discharge tube 134.

The secondary solid waste container 100 can be configured to be arranged within the analyzer 120 at a position below a compartment 136 for receiving the primary solid waste container 126 with respect to a direction of gravity. For this reason, the height 114 of the side walls 102 of the secondary solid waste container 100 can be rather small and particularly significantly smaller than a height 138 of the primary solid waste container 126. In the first operation state, the primary solid waste container 126 can be received in the compartment 136. Solid waste 124 can be collected in the primary solid waste container 126. Particularly, solid waste 124 can be disposable in the primary solid waste container 126 through the opening 132 thereof.

Figure 3:
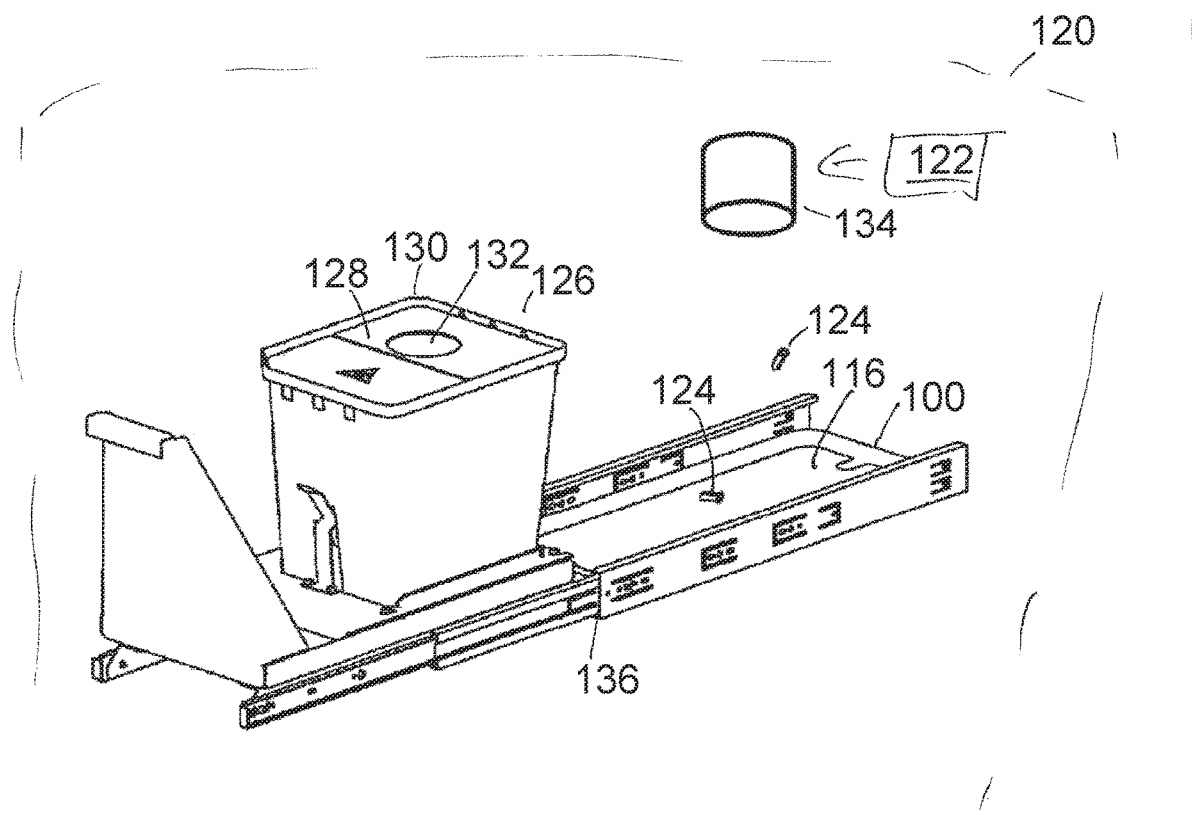
FIG. 3 illustrates the analyzer in a second operation state according to an embodiment of the present disclosure.

FIG. 3 shows the analyzer 120 in a second operation state. In the second operation state, the primary solid waste container 126 can be removed from the compartment 136. For example, the primary solid waste container 126 may be pulled out of the compartment 136 by a drawer-like mechanism, whereas the secondary solid waste container 100 can remain in place. Solid waste 124 can continue falling from the discharge tube 134 and can be collected in the secondary solid waste container 100. Particularly, solid waste 124 can be disposable in the secondary solid waste container 100 through the opening 110 thereof. The impact absorbing member 116 can be configured to absorb an impact from solid waste 124 of the analyzer 120. As mentioned before, the impact absorbing member 116 can have damping characteristics. The damping characteristics can be adjusted depending on the type of solid waste 124, the weight of the solid waste 124 and a fall height for the solid waste 124 within the analyzer 120. For example, the deformability of the impact absorbing member 116, and the distance between the impact absorbing member 116 and the lower end 106 of the side walls 102 can be greater the more weight the solid waste 124 has and the greater the fall height is.

Hereinafter, a method for removing solid waste 124 of an analyzer 120 will be described with reference to FIGS. 2 and 3. The primary solid waste container 126 can be disposed within the compartment 136 for receiving the primary solid waste container 126 of the analyzer 120. The secondary solid waste container 100 can be disposed within the analyzer 120 at a position below the compartment 136 for receiving the primary solid waste container 126. Thus, the analyzer 120 can be in the first operation state shown in FIG. 2. During operation of the analyzer 120 and the analytical device 122, consumables 124 can be used and turned into solid waste 124 thereafter. The solid waste 124 can be collected within the primary solid waste container 126 up to a predetermined amount. Particularly, solid waste 124 can be discarded into the primary solid waste container 126 by being dropped out of the discharge tube 134 and through the opening 132 at the cover 128 the primary solid waste container 126. For example, solid waste 124 can be collected within the primary solid waste container 126 up to the primary solid waste container 126 is full.

If solid waste 124 has been collected to the predetermined amount, the primary solid waste container 126 can be removed from the compartment. Thus, the analyzer 120 can be in the second operation state shown in FIG. 3. As the analyzer 120 is continuously operated, solid waste 124 can continuously be produced as well. While the primary solid waste container 126 is removed from the compartment 136, solid waste 124 can be collected within the secondary solid waste container 100. Particularly, the solid waste 124 can be collected within the secondary solid waste container 100 by falling out of the discharge tube 134 and onto the impact absorbing member 116. As the impact absorbing member 116 has damping characteristics, solid waste 124 once fallen thereon can remain on the impact absorbing member 116 and may not be reflected out of the secondary solid waste container 100. It is the combined effect of material and shape, such as thin and flexible, and air cushion underneath the impact absorbing member 116 that can enable shock wave dissipation.

The solid waste 124 collected within the primary solid waste container 126 can be discharged and the primary solid waste container 126 can be disposed or re-inserted into the compartment 136 after the solid waste 124 has been discharged therefrom. After disposing the discharged primary solid waste container 126 into the compartment 136, solid waste 124 can be collected within the primary solid waste container 126 again. Thus, solid waste 124 can be collected within the secondary solid waste container 100 while the primary solid waste container 126 is removed from the compartment 136.

Further, the solid waste 124 collected within the secondary solid waste container 100 may be discharged after disposing the discharged primary solid waste container 126 into the compartment 136. After discharging solid waste 124 collected within the secondary solid waste container 100, the impact absorbing member 116 may be cleaned. Further, after discharging solid waste 124 collected within the secondary solid waste container 100, the impact absorbing member 116 may be sterilized and/or autoclaved.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. An analyzer, the analyzer comprising:
an analytical device configured to use a consumable;
a primary solid waste container; and
a secondary solid waste container for solid waste of the analyzer, wherein the secondary solid waste container is placed underneath the primary solid waste container, wherein the secondary solid waste container comprises side walls and an impact absorbing member, wherein the side walls comprise an upper end and a lower end, wherein the impact absorbing member is connected to the side walls such that the impact absorbing member extends between the side walls and is spaced apart from the lower end with respect to a direction from the lower end to the upper end, wherein the impact absorbing member is configured to absorb an impact from solid waste of the analyzer, and wherein the impact absorbing member is disposed a predetermined distance from a plane parallel to the lower end of the side walls, wherein the impact absorbing member absorbs an impact from solid waste by being at least partially deflected or deformed towards the plane parallel to the lower end of the side walls such that solid waste is prevented from being reflected in a manner of leaving the secondary solid waste container.

2. The analyzer according to claim 1, wherein the secondary solid waste container is arranged within the analyzer at a position below a compartment for receiving the primary solid waste container of the analyzer with respect to a direction of gravity.

3. The secondary solid waste container according to claim 1, wherein the impact absorbing member is connected to the side walls at a position located within an upper half of a height of the side walls.

4. The secondary solid waste container according to claim 1, wherein the impact absorbing member is connected to a rim of the side walls.

5. The secondary solid waste container according to claim 1, wherein the impact absorbing member has damping characteristics.

6. The secondary solid waste container according to claim 5, wherein the damping characteristics are adjusted depending on the type of solid waste, the weight of the solid waste, and a fall height for the solid waste within the analyzer.

7. The secondary solid waste container according to claim 1, wherein the impact absorbing member is deformable so as to absorb an impact from solid waste of the analyzer.

8. The secondary solid waste container according to claim 1, wherein the impact absorbing member is made of a sterilizable and/or autoclavable material.

9. The secondary solid waste container according to claim 1, wherein the impact absorbing member is at least partially made of plastics or metal.

10. The secondary solid waste container according to claim 1, wherein the impact absorbing member is completely made of plastics or metal.

11. The secondary solid waste container according to claim 1, wherein the impact absorbing member is made of at least one element selected from the group comprising polypropylene, polyvinyl chloride, polyethylene, high density polyethylene, polytetrafluoroethylene, polyethylene terephthalate and aluminum.

12. The secondary solid waste container according to claim 1, wherein the impact absorbing member has a thickness in a range of 0.25 mm to 3.0 mm.

13. The secondary solid waste container according to claim 1, wherein the impact absorbing member has a thickness in a range of 0.5 mm to 2.5 mm.

14. The secondary solid waste container according to claim 1, wherein the impact absorbing member has a thickness in a range of 0.75 mm to 2.0 mm.

15. The secondary solid waste container according to claim 1, wherein the impact absorbing member is a plate, a sheet, a foil or a net.

16. The secondary solid waste container according to claim 1, wherein the secondary solid waste container is configured to be arranged within the analyzer at a position below a compartment for receiving a primary solid waste container of the analyzer with respect to a direction of gravity.

* * * * *